(No Model.)  2 Sheets—Sheet 1.

B. JENNINGS.
CONDUIT ELECTRIC RAILWAY.

No. 432,944.  Patented July 22, 1890.

Witnesses:
Geo. H. Strong.

Inventor,
Byron Jennings
by Dewey & Co.
Atty.

(No Model.) 2 Sheets—Sheet 2.

B. JENNINGS.
CONDUIT ELECTRIC RAILWAY.

No. 432,944. Patented July 22, 1890.

Witnesses,
Geo. H. Strong

Inventor,
Byron Jennings
By Dewey & Co.
Attys

UNITED STATES PATENT OFFICE.

BYRON JENNINGS, OF SAN JOSÉ, CALIFORNIA.

CONDUIT ELECTRIC RAILWAY.

SPECIFICATION forming part of Letters Patent No. 432,944, dated July 22, 1890.

Application filed February 6, 1889. Serial No. 298,891. (No model.)

*To all whom it may concern:*

Be it known that I, BYRON JENNINGS, of the city of San José, county of Santa Clara, and State of California, have invented an Improvement in Conduit Electric Railways; and I hereby declare the following to be a full, clear, and exact description of the same.

My invention relates to improvements in conduit electric railways; and it consists in details of construction which will be more fully explained by reference to the accompanying drawings, in which—

Figure 1:
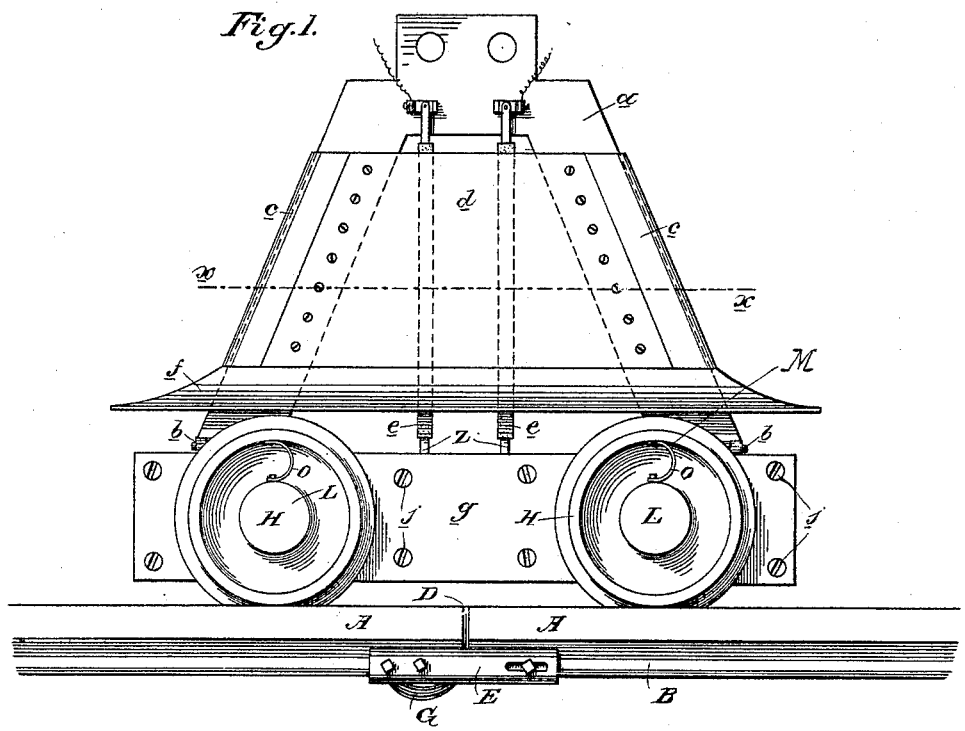
Figure 2:
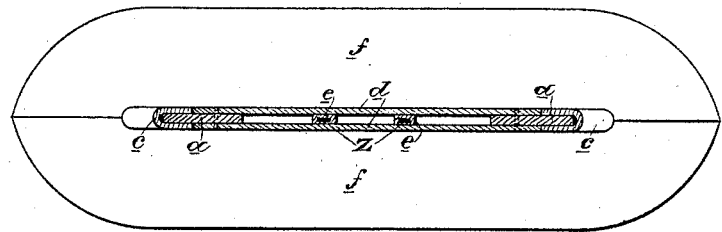
Figure 3:
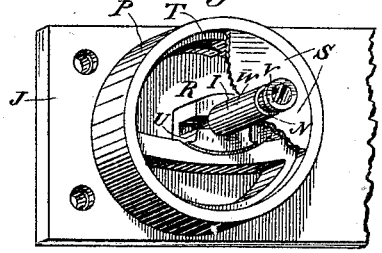
Figure 4:
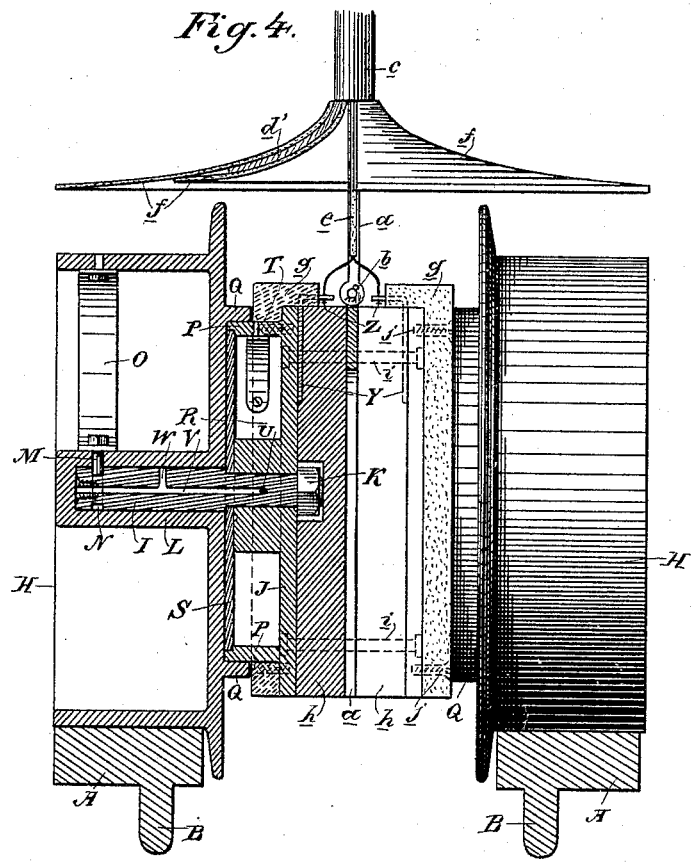
Figure 5:
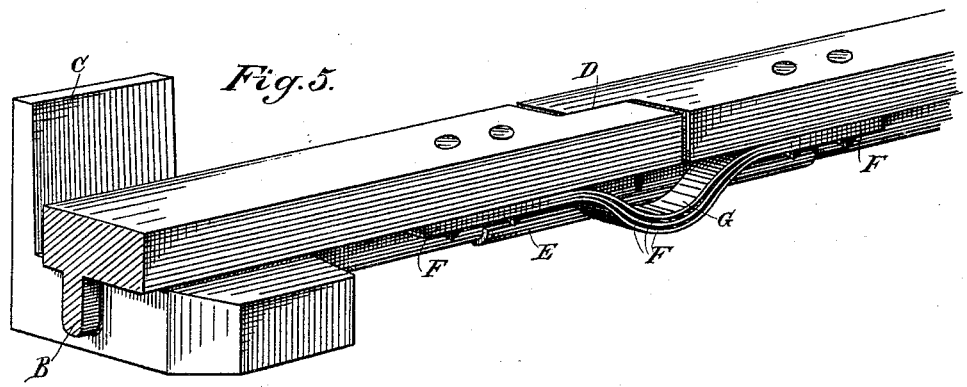

Figure 1 is a side elevation of my trolley. Fig. 2 is a horizontal section taken on the line $x\,x$ of Fig. 1. Fig. 3 is a partial view of the wheel-carrying plate, showing its interior. Fig. 4 is an end view of the trolley, one-half of which is shown in section taken through the center of one of the wheels. Fig. 5 is a perspective view of a rail-joint with its attachments.

This invention relates to that class of electric railways in which continuous conducting-rails are fixed within a tube or conduit and upon which the wheels of the trolley are adapted to travel, said trolley being connected with the car and the motor thereon, so that a current of electricity conveyed through the rails will pass through the trolley to the motor through which the car is propelled.

The object of my invention is to provide a more perfect means of conduction, to allow the conducting-rails to expand and contract without interfering with their conductivity and to provide a perfect conductor through the trolley-wheels and frame, to prevent dirt and foreign substances from falling upon the conducting parts so as to endanger the conductivity or insulation thereof, and to provide means for lubricating the moving parts of the trolley.

A A are the conducting-rails, which in the present case are made with approximately flat upper surfaces upon which the wheels of the trolley are adapted to travel. These rails are rolled or formed with flanges or tongues B, projecting downwardly therefrom, and the chairs C, in which the rails are fixed and supported, have corresponding grooves, into which the flanges B fit and by which the rails are steadied and retained in their proper position. Suitable insulators are placed between the rails and the chairs. These rails may abut with plain ends, or they may be made, as shown, with extensions formed on the opposite sides of the adjacent ends of the meeting rails, so that they may overlap each other, as shown at D. The flanges B of adjacent meeting rails are secured together by fish-plates E, having one end suitably slotted and bolts passing through the fish-plates and corresponding holes in the flanges B, so as to retain the rails in proper relation with each other, but at the same time to allow them to move and accommodate themselves to the contraction and expansion which will take place by reason of changes in temperature. These rails form the conductors through which the current of electricity passes along the line, and in order to insure the perfect continuance at the intersections of the rails, and at the same time to allow the rails to move and expand and contract, as above described, without too much rigidity in the connections, I employ a series of plates of copper F. These copper plates are thin, and are laid together until they form a suitable thickness. They are curved into semicircular form, as shown at G, just at the meeting ends of the adjacent rails, and, extending thence in each direction, are bolted to the bottom of the rails by the side of the flanges B, as shown. By building this connection up of thin plates of metal I insure a sufficient amount of conducting-surface, with so much flexibility on account of the separate strips that the rails will be allowed to expand and contract independently of each other and without danger of their pushing the whole line along and out of place. The ends of these plates may be soldered or otherwise secured together for convenience in handling and to prevent rusting or oxidation between them.

The trolley-wheels H are flanged and adapted to travel upon the rails A. They are journaled upon the spindles I, the inner ends of which pass through holes in the plate J and are secured therein by the nut K on the inner end. The hubs L of the trolley-wheels are closed at the outer end, and a spring-actuated pin M, passing through the side of the hub, fits into a groove N, which is turned around the axle, as shown, and by means of this pin the wheel is kept in place upon the axle. By compressing the spring O, which actuates the pin M, the latter may be withdrawn, so as to allow the wheel to be taken off at any time.

The plate J has a semicircular flange P, projecting on the side adjacent to the trolley-wheel, and the wheel is provided with a corresponding flange Q of larger diameter, which projects over the outer edge of the flange P, as shown. A chamber R is formed within the projecting flange P, and this is closed by a tight-fitting plate S, against the face of which the inner face of the trolley-wheel abuts. Through the upper side of the flange P is made a hole T, into which oil or lubricant is poured, so as to fill the chamber R to any desired degree. From the chamber R the lubricant flows through a hole U into the interior of the axle I, passing along the passage V, and it escapes from this passage through a hole W within the interior of the hub L of the trolley-wheel, and it may also pass out through a passage made in the screw by which the outer end of the hole V in the axle is closed. By this arrangement I am enabled to supply the proper amount of lubricant at all times to the trolley-wheels without exterior grease, which would attract dirt and eventually interfere with the insulation of the parts, which it is necessary should be perfectly insulated.

A frame Y is fixed to the plate J, which projects upwardly and is bent inwardly, its inner end serving as an attachment for the conducting-wire Z, which leads to the motor on the car. The frame J, which carries the trolley-wheels, is connected with the car by means of a frame-work a, hinged to its upper edge, as shown at b, and extending up into the car or motor, where it is attached by suitable bolts or attachments at the upper end. Around each of the edges of this plate where it passes upward through the slot in the conduit or tunnel is fixed a nosing c, which surrounds the edges of this plate or frame, and these nosings, thus projecting upon each side serve to take the wear caused by the passage between the sides of the slot.

Extending from one side to the other of the frame a and lying between the nosings, which thus form a depression for it, is a plate d, and the wires Z, passing up through suitable insulators e, extend up into the car and are there connected with the motor. These wires are perfectly protected between the plates d, and as the insulating material which surrounds them is elastic it is somewhat flattened by screwing the plates d together, so as to be held firmly in place.

The lower edge of the plates d are curved outwardly, as shown at d', to a point near the tops of the flanges of the wheels or trolleys H. Plates of rubber or other suitable material f are fitted or otherwise secured to the edges of the outwardly-turned plates d', and thence extend over the tops of the trolley-wheels upon each side, and are there bent so as to pass around the front of the trolley-frame from one side to the other. By this construction they serve as guards or shoulders to keep dirt and mud which may fall through the slot from falling upon the conducting parts of the trolley, which would form a conductor at undesirable points if allowed.

I have thus far described only one side of the trolley-frame. It will be understood that the trolley-wheels are in pairs upon opposite sides of the frame, each wheel running upon its own conducting-rail, so that the current passing through one rail passes up into the motor and thence down through the other wire and the other trolley-wheel into the opposite rail, so as to form a complete circuit.

The plates J are suitably inclosed in non-conducting material g, which is secured by screws to the outside of the plates, while between the plates are fitted non-conductors h. These are united together by means of bolts i, passing through the two frames J J, into which the heads of the bolts are partially countersunk, while the nuts upon the opposite side may also, if desired, be countersunk into the plate against which they turn. The non-conducting plates g, being then placed over these bolt-heads and nuts, are secured, as above described, to the exterior of the plates by screws, as shown at j.

Having thus described my invention, what I claim as new, and desire to secure by Letters Patent, is—

1. In a conduit electric railway, the rails having the downwardly-projecting tongues or flanges and overlapping meeting ends secured by fish-plates, in combination with the slotted chairs with the insulated material within which the tongues upon the rails are fitted and secured, substantially as described.

2. In a conduit electrical railway, the rails having the downwardly-projecting flanges which are supported in slotted chairs within the conduit, the meeting ends of the rails overlapping and secured by fish-plates, in combination with the connecting-plates consisting of thin sheets of copper bent into semicircular concentric curves at the meeting points of the rails and independent of each other, the ends of said plates extending along the under sides of the rails and fixed thereto, substantially as described.

3. The yoke connecting the motor-car of an electric conduit railway with the trolley which travels within the conduit, and having the plates d secured upon opposite sides to form a channel between which the conducting-wires pass through the car to the trolley, the lower edges of said plates being bent outwardly and carrying the projecting dust-guards above the trolley-wheels, substantially as described.

4. The dust-guards f, supported above the trolley-wheels and bent so as to extend around the front of the trolley-frame from one side to the other, substantially as described.

5. A trolley-frame having the exterior and interior insulating-plates, the shafts or axles projecting outwardly therefrom and having the trolley-wheels fitted to turn upon said shafts, in combination with the pins M and springs O, whereby the trolley-wheels are retained in place upon their axles, substantially as described.

6. A trolley-frame consisting of the metal plates with the interior and exterior insulating-surfaces, the axles fixed to said plates and projecting outwardly, having the trolley-wheels adapted to turn thereon, in combination with the inclosed oil-chambers within the trolley-frame, and passages extending through the axles and connecting therewith so as to lubricate the trolley-wheels and axles, substantially as described.

In witness whereof I have hereunto set my hand.

BYRON JENNINGS.

Witnesses:
GEO. H. STRONG,
S. H. NOURSE.